United States Patent [19]

Kohara et al.

[11] 4,181,406
[45] Jan. 1, 1980

[54] ELECTROCHROMIC DISPLAY DEVICE

[75] Inventors: Rikusei Kohara, Ibaraki; Takashi Aoyama, Takatsuki, both of Japan

[73] Assignee: Matsushita Electric Industrial Co., Ltd., Kadoma, Japan

[21] Appl. No.: 827,107

[22] Filed: Aug. 23, 1977

[30] Foreign Application Priority Data

Sep. 2, 1976 [JP] Japan .................. 51-105538
Nov. 17, 1976 [JP] Japan .................. 51-138947

[51] Int. Cl.$^2$ .............................................. G02F 1/17
[52] U.S. Cl. .................................................. 350/357
[58] Field of Search ............ 350/357; 340/324 R, 340/324 M, 336

[56] References Cited

U.S. PATENT DOCUMENTS

| | | | |
|---|---|---|---|
| 3,854,794 | 12/1974 | Van Dam | 350/357 |
| 3,879,108 | 4/1975 | Berets | 350/357 |
| 3,961,842 | 6/1976 | Jasinski | 350/357 |

OTHER PUBLICATIONS

J. Bruinink, "Electrochromic Display Devices", *Nonemissive Electro-optic Displays*, Plenum Press, New York, (1975), pp. 201-218.
C. J. Shoot et al., "New Electrochromic Memory Display", Appl. Phys. Lett., vol. 23, No. 2, Jul. 15, 1973, pp. 64-65.

*Primary Examiner*—James W. Davie
*Attorney, Agent, or Firm*—Cushman, Darby & Cushman

[57] ABSTRACT

An improved electrochromic display device having a transparent container containing an indication electrode, a counter-electrode and an electrochromic solution contacting the electrodes is disclosed. The improvement is that the counter-electrode is provided with a coating of a reduction product of the color displaying ions or an oxidation product of the color displaying ions of the electrochromic solution. By means of forming the coating of a color displaying product, when a current flows across the indication electrode and counter-electrode, the same redox reaction takes place at both electrodes but the reactions proceed in opposite directions. As a result, the redox reaction can be caused to proceed with a voltage lower than the redox potential of the reaction itself and hence, electrode contamination by additional electrolytic reaction products can be avoided thereby prolonging the life of the device.

14 Claims, 5 Drawing Figures ic display device, and particularly concerns an electrochemical electrochromic display device utilizing a redox reaction of an electrochromic compound.

ELECTROCHROMIC DISPLAY DEVICE

BACKGROUND OF THE INVENTION

This invention relates to an improvement in an electrochromic display device, and particularly concerns an electrochemical electrochromic display device utilizing a redox reaction of an electrochromic compound.

The electrochromic display devices are expected to have a promising future since the color of indication is brilliant, necessary voltage and current are small and there is no restriction as to the observing angle. However, hitherto, the useful lives of the electrochemical electrochromic display devices have not been satisfactorily long. The electrochromic devices of the electrochemical type make use the change of light absorption or light reflection of the redox reaction products formed on indication electrode by the electrochemical redox reaction of an electrochromic substance. The redox reaction takes place when a voltage is impressed across an indication electrode and a counter-electrode both contacting the electrochromic substance in the liquid state, gel state or solid state. Erasing of the indication is made by impressing an inverse voltage across the electrodes, so that a reverse redox reaction takes place thereby dissolving the redox reaction product on the indication electrode.

As can be understood from the foregoing description, when the electrochemical electrochromic substance is A·B which dissociates as $$A \cdot B \rightarrow A^+ + B^- \qquad (1),$$

a reduction reaction at the cathode is:

$$A^+ + e^- \rightarrow A \qquad (2),$$

and an oxidation reaction at the anode is $$B^- \rightarrow B + e^- \qquad (3).$$

When the substance A deposited on the cathode by the reduction reaction (2) is a color indication product, the cathode makes color indication, and an oxidation reaction (3) takes place on the anode, thereby depositing a by-product B made from the counter-ion $B^-$ onto the anode. In this case the cathode is the indication electrode and the anode is the counter electrode.

On the other hand, when the substance B deposited on the anode by the oxidation reaction (3) is a color indication, and a reduction reaction (2) takes place on the cathode, a by-product A made from the counter-ion $A^+$ is deposited onto the cathode. In this case, the anode is the indication electrode and the cathode is the counter-electrode.

The abovementioned by-products deposited on the counter-electrode are dissolved again into the electrochromic substance during erasing.

Thus, in the conventional electrochemical electrochromic device, a by-product is formed by a counter redox reaction as contrasted to the color indicating redox reaction on the indication electrode.

According to an electrochemical principle, the a threshold voltage required to initiate an electrochemical redox reaction of an entire system is given by the difference between the redox potential at the cathode and the redox potential at the anode. In the conventional electrochemical electrochromic devices, the redox reaction on the counter electrode is not the same as that on the indication electrode as will be understood by comparing the formulas (2) and (3) above. Accordingly, the abovementioned threshold voltage necessary to initiate the redox reaction of the system for the indication is given by:

—the difference between—

[the redox potential at the indication electrode]

and

[the redox potential at the counter-electrode]    (4).

For example, in an electrochemical electrochromic indication device using heptyl viologen bromide as the electrochromic substance, the difference is:

$$-0.28\,V - (+0.83\,V) = -1.11\,V. \qquad (5),$$

and therefore, a voltage exceeding 1.11 V has been used to initiate the redox reaction. And, the by-product is deposited on the counter electrode, thereby deteriorating the indication speed and density of indicated color.

SUMMARY OF THE INVENTION

The purpose of the present invention is to provide an improved electrochemical electrochromic device, wherein the reaction can be caused by lower voltages than the conventional devices, thereby avoiding contamination of electrodes with by-product hitherto deposited on the counter-electrode, hence prolonging life of the device.

DETAILED DESCRIPTION OF THE INVENTION

Figure 1:
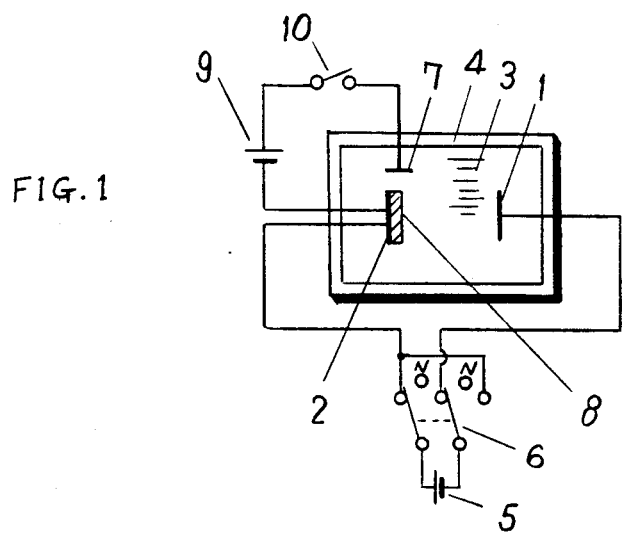
FIG. 1 is a sectional view with relevant circuit of a fundamental embodiment of the present invention.

An electrochromic display device of the present invention comprises a container having at least one observation window on its wall and containing an indication electrode, a counter-electrode and an electrochemical electrochromic substance contacting said indication electrode and said counter-electrode, and is characterized in that said counter-electrode has a coating of a color displaying product of a redox reaction of the electrochemical electrochromic substance at the state when an erasing is completed.

The present invention is further described with reference to the drawing which shows preferred embodiments of the invention.

In FIG. 1, which shows a fundamental embodiment of the invention, a container 4 is provided of a transparent plastic, glass or an insulator having at least a transparent window on one part. The container 4 contains an indication electrode 1, a counter-electrode 2, an auxiliary electrode 7 and an electrochemical electrochromic substance 3, which contacts the electrodes. The electrochromic substance 3 may be in the liquid state, gel state or solid state. The indication electrode 1 and the counter-electrode 2 are connected through a change-over reversing switch 6 to a D.C. power source 5. The switch 6 is thrown leftward for writing (indication) and rightward for erasing, respectively. Also the auxiliary electrode 7 is connected through a switch 10 to a positive terminal of an auxiliary D.C. source 9, a negative terminal of which is connected to the counter-electrode 2.

The present invention is characterized by the construction that when indicating ions (the color indication product) are cations $A^+$, (for example, heptyl viologen ions $V^{++}$), then a film 8 of reduction product A (for example, $V^+\cdot$ for the viologen ions $V^{++}$) is formed on a surface of the counter-electrode 2, and on the contrary, when the indicating ions (the color indication product) are anions $B^-$, then a film 8 is of oxidation product B.

Namely, when the color displaying redox reaction on the indication electrode 1 is as indicated by the below mentioned formula (6) or (7), $$A^+ + e^- \rightleftarrows A \tag{6},$$

$$\text{or } B^- \rightleftarrows B + e^- \tag{7},$$

then the coating on the counter-electrode 2 should be the redox reaction product of color displaying ions $A^+$ or $B^-$, respectively.

Then, on the counter-electrode 2, the following counter reaction (8) or (9) against the color indicating redox reaction of (6) or (7) takes place, respectively:

$$A \rightleftarrows A^+ + e^- \tag{8}$$

or $$B + e^- \rightleftarrows B^- \tag{9}.$$

As a result, the reaction (6) or (7) on the indication electrode 1 and the counter-reaction (8) or (9), namely the set of reactions (6) and (8) on both electrodes of the system or set of reactions (7) and (9) on both electrodes of the system, become the same redox reaction with each other, and only the direction of the reaction is opposite to the other. Since the same redox reactions take place on both electrodes 1 and 2, necessary threshold voltage to initiate the redox reaction of the system becomes zero from the abovementioned rule (4). However, in an actual device, in order to attain the desired reaction speed, a specified small voltage should be impressed across the indication electrode 1 and the counter-electrode 2.

According to the abovementioned principle, the system of the redox reaction can proceed with a very low voltage, for example, 0.1 to 1.0 V. By so selecting the voltage across the indicating electrode 1 and the specially coated counter-electrode 2, namely, sufficiently lower than conventional system, we can exclude other undesirable redox reactions than the kind made on the indication electrode 1 from on the counter-electrode 2. In other words, by forming the coating of the color indication redox product and also selecting the voltage across the electrodes 1, 2 to be low, in the writing and erasing reactions, we can avoid the formation of additional electrolytic reaction products including additive ions and counter ions. Since the undesirable other redox reactions are excluded, we can avoid electrode contaminations due to redox reactions of counter ions and of additive or impurity ions. Accordingly a longer life time for the device is obtained.

The abovementioned advantage of the present invention as contrasted to a conventional device is more fully explained by taking one example of heptyl viologen bromide $V^{++}2Br^-$ as the electrochromic compound.

In the conventional electrochromic device using the heptyl viologen bromide, color indicating redox reactions $$V^{++} + e^- \rightleftarrows V^+\cdot \tag{10}$$

(wherein, dot after plus symbol indicates free radical,) are made on the indication electrode 1, and counter redox reactions $$Br^- \rightleftarrows Br + e^- \tag{11}$$

are made on the counter-electrode 2. Rightward reactions indicate writing-in and leftward reactions indicate erasing-off, in the abovementioned formulas (10) and (11). In this device, the necessary voltage for initiating the reaction is given by the difference between $$[-0.28 \text{ V vs. Ag/AgBr for } V^{++} \text{ ions}]$$

and $$[+0.83 \text{ V vs. Ag/AgBr for } Br^- \text{ ions}],$$

(wherein vs. Ag/AgBr implies measured by a AgBr standard cell). Accordingly, the necessary voltage for the chemical process in the electrochemical system is $$-0.28 \text{ V} - (+0.83 \text{ V}) = -1.11 \text{ V}$$

By contrast, in the device of FIG. 1 of the present invention, a color indicating redox reaction $$V^{++} + e^- \rightleftarrows V^+\cdot \tag{10}$$

is made on the indication electrode 1, and a counter redox reaction on the counter-electrode 2 coated with the substance $V^+\cdot$ is $$V^+\cdot \rightleftarrows V^{++} + e^- \tag{12}.$$

Rightward reactions indicate writing-in and leftward reaction indicate erasing-off.

This means that both redox reactions are substantially identical in the present invention, but differs only in their direction. Therefore, necessary voltage for initiating the reaction is given by a difference of:

$$-0.28 \text{ V} - (-0.28 \text{ V}) = 0 \text{ V}.$$

Thus the theoretical voltage necessary for the redox reaction becomes zero. Therefore, this device can be written in and erased off by a very low voltage. If the voltage of the counter-electrode 2 is selected to be lower than 0.83 V vs. Ag/AgBr, which is for the redox potential of $Br^-$ ions, the reaction of the system can be made only for reactions relating to the ions $V^{++}$, irrespective of existence of $Br^-$ in the electrochromic substance. Since the reaction relating to $Br^-$ can be thus excluded, contamination of the electrode caused by $Br^-$ ions can entirely be excluded.

During the redox reaction for writing, the substance $V^+\cdot$ in the film 8 previously formed on the counter-electrode 2 is consumed by the counter reaction of formula (12) (rightward) on the counter-electrode 2. Simultaneously, the same amount of the substance $V^{+\cdot}$ is restored in the film 8 during subsequent erasing reaction of formula (12) (leftward) on the counter-electrode 2. Therefore, theoretically there is no use of supplementing the substance $V^{+\cdot}$ onto the counter-electrode 2. However, in actual devices, some very small part of the substance $V^{+\cdot}$ is lost by reaction with an impurity or by some unknown reason, and therefore, it is advisable to additionally supply the substance $V^{+\cdot}$ after a predetermined large number of repetitions of writing and erasing, for example after every 5,000 cycles of repetitions.

The substance of the film preliminarily to be formed on the counter-electrode 2 must be the reduction product or oxidation product of color indicating substance to be produced on the indication electrode 1 during the reaction for writing, in order that the same reactions of opposite directions are obtained on both electrodes. Namely, when the indicating substance consists of cations, the substance to be deposited on the counter electrode 2 is a reduction product of the cations, while when the indicating substance consists of anions, the substance to be deposited on the counter-electrode 2 is an oxidation product of the anions.

The amount of the redox reaction product of the color indicating ions of the electrochromic compound to be deposited in the film 8 on the counter-electrode 2 must be more than the chemical equivalent of the indicating ions produced during the reaction for the color indication. If the amount of the deposited product is less than the chemical equivalent, during the writing-in operation, namely in the color indicating reaction, the deposited redox reaction product is entirely consumed by the reaction and the reaction stops there. Since the voltage used in this invention for the reaction is very low, after the entire consumption of the deposited redox reaction product, no other reaction than the redox reaction of the color indicating ions takes place at the counter-electrode 2.

Forming the film 8 of the redox reaction product of the color indicating ions on the counter-electrode are made by the following process:

An auxiliary D.C. voltage source 9 is connected through a switch 10 across a third electrode or an auxiliary electrode 7 and the counter-electrode 2, in a manner such that the direction of the current through the counter-electrode 2 is opposite to the direction of the writing current. By closing the switch 10, while keeping the switch 6 in neutral position N, a redox reaction takes place between the electrodes 7 and 2 and a product identical to that to be deposited on the indication electrode 1 for color indication during the writing operation (, which is made by closing the switch 6 to the left side,) is deposited on the counter-electrode 2 forming the film 8. For example, when the electrochromic compound is heptyl viologen bromide and the redox reaction is of the aforementioned formula (10), the substance of the film 8 formed on the counter-electrode 2 is the reduction product $V^{+\cdot}$ of the viologen ions $V^{++}$. The counter ions $Br^{-}$ against color indicating ions are present on the auxiliary electrode 7. The abovementioned film 8 of the redox reaction product of color indicating ions is stably retained on the counter-electrode 2 when the circuit of the counter-electrode is open. For the auxiliary voltage source, the main D.C. power source 5 can be used by providing a suitable switch circuit for use as the auxiliary battery.

The operation of the fundamental embodiment of FIG. 1 is as follows:

After depositing, as the film 8, the necessary amount of the redox product of the electrochromic indicating ions on the counter electrode 2, by closing the switch 10 for a specified time period, the switch 10 is open.

Then, the interlocking switch 6, which has been resting on the neutral non-connection position, is thrown to the left side for a specified time period to impress the writing voltage across the electrodes 2 and 1. With this switching, rightward reaction of the formula (10) takes place on the indication electrode 1 and reduction product $V^{+\cdot}$ of the color indicating substance $V^{++}$ is deposited on the indication electrode 1 thereby indicating a purple color thereon. This color is retained while the switch 6 is on the neutral position N.

Then, erasing is made by throwing the switch 6 rightward, for the same time period with the writing time. By this switching, the current flowing across the electrodes 1 and 2 is inversed and therefore the redox reactions of the formula (10) and (12) are inversed to react leftward of the formula. The switch 10 is closed for resupplying the function of the product formed on the counter-electrode 2, after every 5,000 cycles of display and erasing.

As already described in the foregoing, the threshold voltage necessary for the reaction of the present invention is theoreticaly zero, and any low voltage which is lower than the threshold voltage of the undesirable reaction on the electrode can be used as the voltage across the indication electrode 1 and the counter-electrode 2. Accordingly, use of such a low voltage, for example 0.1 V to 1 V is preferable.

Figure 2:
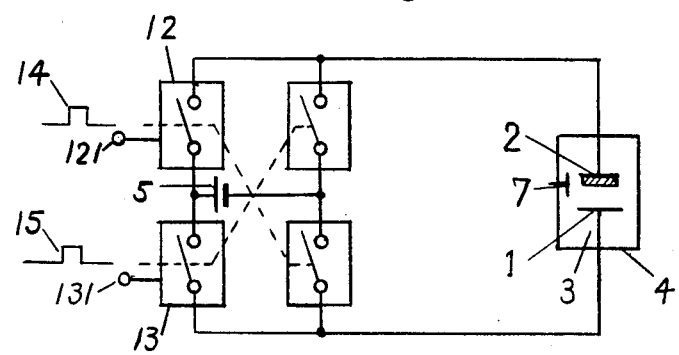
FIG. 2(a) and FIG. 2(b) are circuit diagrams of more practical embodiments of the present invention.
Figure 2:
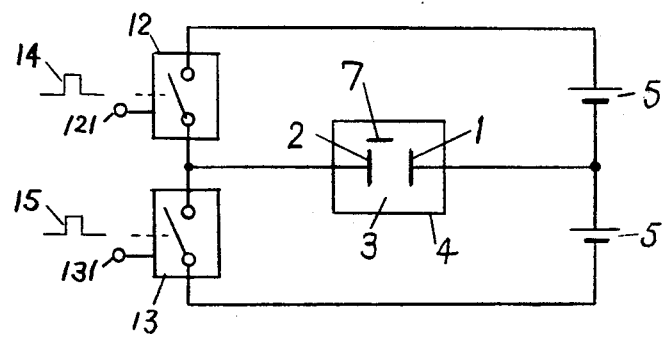

FIG. 2 shows actual embodiments, wherein FIG. 2(a) shows a circuit using one battery and FIG. 2(b) shows a circuit using two batteries. In the electric operation, both circuits are equivalent. In both circuits, switching circuits 12 and 13, for example, transistor circuits, reed switches or relays are for writing and erasing, respectively, and are made "ON" during input pulses 14 and 15 are impressed on their input terminals 121 and 131, respectively. The cell containing indication electrode 1, counter-electrode 2, auxiliary electrode 7 and electrochromic compound 3 in a container 4 is the one elucidated referring to FIG. 1. Detailed circuitry for the auxiliary electrode 7 can be the same as with that of FIG. 1, but is omitted from FIG. 2.

As the electrodes 1, 2 and 7, chemically stable electrodes, for example, of platinum, palladium, gold or graphite are suitable.

This invention is generally applicable not only to the device containing a viologen compound electrochromic substance, but also to any of electrochromic devices of silver compounds, iodide compounds, polytungsten acid compounds, etc. in the liquid state, gel state and solid state.

EXAMPLE 1

In the device of FIG. 1, the indication electrode 1, the counter-electrode 2 and the auxiliary electrode 7 are made with platinum, disposed in line, with 2 mm gaps inbetween. These electrodes are immersed in an aqueous solution 3 containing 0.1 mol/l of heptyl viologen bromide as the electrochromic compound and 0.3 mol/l of potassium bromide (KBr) as the supporting electrolyte. Preliminary to a first writing, a D.C. pulse of 2 V and 300 ms (milli seconds) width is impressed across the auxiliary electrode 7 as anode and the counter-electrode 2 as cathode, thereby to deposit a purple colored film 8 of reduction product $V^{+\cdot}$ of the heptyl viologen cation $V^{++}$ on the counter-electrode 2. When the indication electrode 1 and the counter-electrode 2 are shortcircuited to each other, actually no immediate phenomenon is observed, though theoretically a very slow, dissolving of the reduction product $V^{+\cdot}$ from the counter-electrode into the solution 3 and a very slow deposition of the equivalent amount of $V^{+\cdot}$ onto the indication electrode 1 should be made.

When a D.C. voltage of 0.1 volt is impressed across the counter-electrode 2 as anode and the indication electrode 1 as cathode, the redox reaction for writing takes place thereby gradually dissolving purple substance $V^{+\cdot}$ on the counter-electrode 2 and gradually depositing equivalent amount of the purple substance $V^{+\cdot}$ onto the indication electrode 1. When the voltage across the indication electrode 1 and the counter-electrode 2 is inversed, the purple indicating substance $V^{+\cdot}$ on the indication electrode 1 is erased being dissolved into the solution and the equivalent amount of the purple substance $V^{+\cdot}$ is deposited on the counter electrode 2. Speed of the writing and erasing is dependent on the voltage applied across the electrodes 1 and 2.

For the operating voltage of 0.8 V, the writing and the erasing is made within 200 ms. When the device is operated by the voltage of 0.8 V, there is no fear of inducing contamination of the electrodes 1 and 2 due to the oxidation reaction of the $Br^-$ counter ion of the electrochromic compound. Accordingly, the abovementioned device provides clear indication and normal operation even after repetitions of 500,000 cycles of writing-and-erasing, with supplementation of the reduction product on the counter-electrode 2 by closing the switch 10 to impress 2 V × 300 ms D.C. pulse thereon after every 5,000 cycles of writing and erasing.

EXAMPLE 2

The construction is identical to that of FIG. 1; the indication electrode 1 and the counter-electrode 2 are made with gold, and the auxiliary electrode 7 is made with platinum. Other details and operations of the device are made in the same way as with example 1.

For the operating voltage of 0.5 V, the writing and the erasing is made within 200 ms. The device provides clear indication and normal operation even after repetitions of 500,000 cycles of writing-and-erasing, with supplementation of the counter-electrode 2 by impressing 2 V × 30 ms D.C. pulse thereon after every 5,000 cycles of writing and erasing.

EXAMPLE 3

In the construction of FIG. 1, the indication electrode 1 and the auxiliary electrode 7 are made with platinum, and the counter-electrode 2 is made with graphite. Other details and operations of the device are made in the same way with the example 1.

In the device of this example, necessary voltages for writing and erasing within the time period of 200 ms are 0.5 V and 0.9 V, respectively. The device performs clear indication and normal operation even after repetitions of 500,000 cycles of writing-and-erasing, with the abovementioned supplementation of the counter-electrode after every 5,000 cycles of writing and erasing.

EXAMPLE 4

In order to make comparison with the achieved results of the abovementioned Examples 1, 2 and 3, a conventional type device with the indication electrode 1 and the counter-electrode 2 of platinum, but dispensing with the auxiliary electrode, hence dispensing with the preliminarily formed reduction product $V^{+\cdot}$, is tested. In this conventional device, necessary voltages for writing and erasing within the time period of 200 ms are 1.5 V to 2 V. The device is severely damaged due to electrode contamination by the counter ion $Br^-$ and can not perform normal operation only after repetition of 5,000 cycles of writing-and-erasing.

The present invention can be embodied not only by the auxiliary electrode mentioned in the foregoing embodiments, but also by other ways of forming a film of a reduction product or an oxidation product of color displaying ions on the counter-electrode.

EXAMPLE 5

Figure 3:
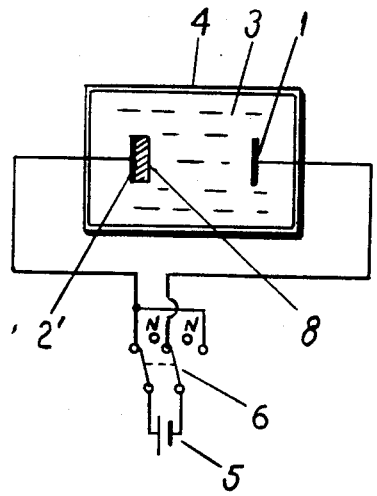
FIG. 3 is a sectional view with relevant circuit diagram of another embodiment of the present invention.

In the example of FIG. 3, a container 4 is of a transparent plastic, glass or the like material and contains an electrochromic substance 3, an indication electrode 1 and counter electrode 2' therein. The indication electrode 1 is made of a chemically stable conductor such as platinum or gold, but the counter-electrode 2' is made with a metal or conductor thereon such that a redox reaction product of a color indicating ion, for example $V^{+\cdot}$, of the electrochromic substance is spontaneously deposited by means of the difference of redox potentials between the metal and the electrochromic substance, when the metal surface is in contact with the electrochromic substance.

Examples of such metals or conductors for cationic or anionic electrochromic substances are as follows:

(1) For hexyl viologen cations, heptyl viologen cations, octyl viologen cations or benzyl viologen cations as the electrochromic substance: Zn, Pb, Sn, In, Cd, Fe or alloy thereof.

(2) For p-cyanophenyl viologen cations or silver compound cations as the electrochromic substance: Zn, Pb, Sn, In, Cd, Fe, Al, Ni, Cu or alloy thereof.

(3) For polytungstic acid cations: Zn, Pb, Sn, In, Cd, Fe, Al or alloy thereof.

(4) For anion of iodide compounds of for example, tetralkyl ammonium iodide, acetylcholine iodide, propionylcholine iodide: $Ag_2O$, $MnO_2$, $NiO$, $PbO_2$ or mixtures thereof.

When the electrochromic compound is of a type having the anion as color indicating substance, then the conductor suitable for the abovementioned type of counter-electrode should be selected from conductors having a larger redox potential than that of the color indication anion of the electrochromic compound.

By using such a metal or conductor as the counter-electrode 2' then the film 8 of the redox reaction product of the color indicating substance (ions) is spontaneously formed on the counter-electrode 2'. Accordingly, similarly to the foregoing examples, the redox reactions on the indication electrode 1 and on the counter-electrode 2' can be made same.

When heptyl viologen bromide $V^{++}.2Br^-$ is used as the electrochromic compound, then the electrochromic compound dissociates into color indicating cations $V^{++}$ and counter ions $Br^-$ in the solution. The indication electrode 1 is made with platinum or gold and the counter-electrode 2' is made with zinc, lead, tin, indium, cadmium, iron, their alloy, $Ag_2O$, $MnO_2$, etc. The counter electrode may be made by plating these metals on platinum, gold or a similar stable metal. Since the counter-electrode of zinc, lead or tin has the more negative redox potential, the belowmentioned reactions take place on the counter-electrode 2', where M indicates the metal or conductor of the counter-electrode 2'.

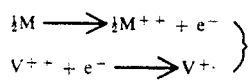

accordingly

Namely, a specified amount of the metal M dissolves from the counter-electrode 2' into the electrochromic solution 3, and simultaneously, the redox reaction product $V^{+\cdot}$ of the color indication ions $V^{++}$, and hence a violet colored film 8 is formed on the counter-electrode 2'. When the entire surface of the counter electrode becomes covered with the film 8 of the reduction reaction product $V^{+\cdot}$, then the abovementioned reactions (13), (14) stop because surface of the metal M is isolated from the solution.

As a result of using the counter-electrode 2' covered with the film 8 of the redox reaction product of the color indicating substance, the necessary threshold voltage for initiating the color indication reaction and erasing reaction becomes theoretically zero.

The solution 3 contained in the container 4 is an aqueous solution containing 0.1 mol/l of heptyl viologen bromide as the electrochromic compound and 0.3 mol/l of potassium bromide (KBr) as the supporting electrolyte. The indication electrode 1 of platinum and the counter-electrode 2' of lead are immersed in the solution with 2 mm gap inbetween. When the counter-electrode 2' of lead is immersed in the electrochromic solution, then the surface of the counter-electrode 2' is rapidly spontaneously covered with the violet reduction reaction product $V^{+\cdot}$ of viologen cations $V^{++}$. In the device of this example using the cations as the indicating substance, a D.C. power source 5 is connected through a switch 6 to the electrodes in a manner such that, for the writing-in the counter electrode 2' is a positive electrode and the indication electrode 1 is a negative electrode.

When a D.C. voltage of 0.1 V is impressed across the electrodes, the color indicating redox reaction is started at a moderate speed, and a violet color appears on the indication electrode while the violet reduction product of the color indication substance, which has been preliminary deposited on the counter electrode by the spontaneous reduction reaction, is dissolved into the solution.

When the polarity of the D.C. power source is reversed for erasing, the violet color indication substance on the indication electrode 1 dissolves into the solution and the equivalent amount of the violet color indication substance is again deposited on the counter-electrode 2'.

When the voltage across the indication electrode 1 and the counter-electrode 2' is higher, the speed of the color indication and erasing reactions becomes faster, and with the voltage of 0.6 V, a speed of writing as well as erasing of within 300 ms is achieved.

When the device is operated with the voltage of 0.6 V, there is no reaction of the counter ion $Br^-$, which necessitates the impressing of a voltage of over 1.11 V. Accordingly, electrode contamination by the counter ion $Br^-$ is totally avoided, and the device performs a clear indication and normal operation even after 100,000 cycles of repetition of writing-and-erasing. Supplementation of the counter electrode, as was done in the previous Examples is not necessary because the redox product is automatically supplemented.

EXAMPLE 6

Figure 4:
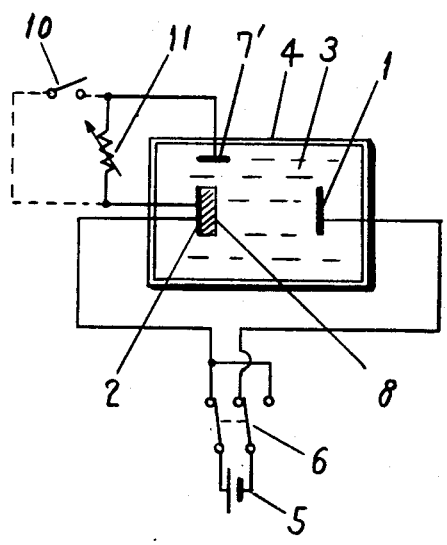
FIG. 4 is a sectional view with relevant circuit diagram of still another embodiment of the present invention.

The construction is identical to that of the example of FIG. 4, wherein a container 4 is of a transparent plastic, glass or the like material and contains an electrochromic substance 3. However, both an indication electrode 1 and a counter electrode 2 are made of a chemically stable metal such as platinum or gold. The container further contains an auxiliary electrode 7'. The auxiliary electrode 7' is made with the aforementioned metal on which a redox reaction product of a color indicating ion, for example, $V^{+\cdot}$ of the electrochromic substance $V^{++}$, is spontaneously deposited by means of the difference of redox potentials between the metal and the electrochromic substance, when the metal surface is in contact with the electrochromic substance. A shortcircuiting branch, which comprises a variable resistor 11 or a switch 10 connected across the contacts of the switch 10, is connected between the auxiliary electrode 7' and the counter-electrode 2. In a modified case, the shortcircuiting branch can be connected across the auxiliary electrode 7' and the indication electrode 1.

As has been explained concerning example 5, when the required type of metal, such as zinc, lead or tin, is immersed in the electrochromic solution such as heptyl viologen bromide, the metal is soon covered with a film of reduction reaction product such as $V^{+\cdot}$ of color indication ion $V^{++}$. Therefore, the auxiliary metal is always covered with a film of the reduction reaction product. Then, by closing the switch 10 or connecting through the resistor 11, the substance of the film 8 and the counter-electrode 2 form a kind of cell. Accordingly, the substance $(V^{+\cdot})$ is gradually transferred onto the surface of the counter-electrode 2, by means of electromotive force of the cell generated by the difference between redox potentials of the substance and the counter-electrode. The reaction of transferring the substance ceases when the counter-electrode is totally covered with the substance. Therefore, the counter-electrode becomes covered by the substance in a manner similar to the device of Example 5.

In the example, when the indication electrode 1 and the counter-electrode 2 are made of gold, and the auxiliary electrode 7' is made with lead, and the auxiliary electrode 7' and the counter-electrode 2 are connected by the resistor of 70 KΩ to each other, then the test results are as follows:

Writing is made with a D.C. voltage of 0.4 V and erasing is made with an inverse D.C. voltage of 0.8 V, respectively, across the counter-electrode 2 and the indication electrode 1.

When the construction is modified in a manner that the resistor 11 is connected to the indication electrode 1 but not to the counter-electrode 2, the indication electrode 1 is from the beginning colored by the substance. Therefore, the manner of using the device is somewhat different. For example, an indication is made by erasing the color on the indication electrode 1. In another way, ordinary writing and erasing voltages are impressed similarly to the foregoing examples, but first writing signal makes no mark because the indication electrode 1 is already colored, but next signal, namely the erasing inverse signal, erases the color on the indication electrode 1 simultaneously forming a redox product on the counter electrode 2.

The violet reduction product $V^{+\cdot}$ of the color indicating ion $V^{++}$ is deposited on the counter-electrode 2 gradually after connecting the shortcircuiting resistor 11.

With the abovementioned operational voltages, the writing and erasing is made within the time period of 200 ms. Even after repetition of 500,000 cycles of writing-and-erasing, the indication is clear and the operation is normal. Supplementation of the counter electrode 2 is not necessary, because the reduction product is supplemented from the auxiliary electrode 7' whenever it is lost for some reason.

EXAMPLE 7

In the device of FIG. 4 (Example 6), the indication electrode 1 is made with platinum, the counter-electrode 2 is made with graphite and the auxiliary electrode 7' is made with tin. When the switch 10 is short-circuited, a current flows through the switch 10 and the reduction reaction product $V^{+\cdot}$ of the color indicating ions $V^{++}$ is deposited as a film 8 onto the counter-electrode 2. When a given amount of the reduction reaction product $V^{+\cdot}$ is deposited on the counter electrode 2, then the current through the switch 10 ceases, and when the reduction reaction product $V^{+\cdot}$ is consumed for some reason, the current again flows thereby supplementing the product $V^{+\cdot}$ onto the counter-electrode 2. Therefore, the product of the necessary specified amount defined by the area of the counter-electrode 2 is always on the counter-electrode 2, thereby enabling the system to operate with a voltage as low as 0.5 V for writing-in.

When tested by impressing a D.C. pulse of 0.5 V and 100 ms width for writing-in and D.C. pulse of 1.0 V and 200 ms width for erasing, the device indicates clear color even after more than 500,000 cycles of repetition of writing-and-erasing. Supplementation of the counter-electrode is not necessary, because the reduction product is automatically supplemented onto the counter-electrode 2 from the auxiliary electrode 7' when lost for some reason.

EXAMPLE 8

A comparison test of the foregoing examples 5 to 7 is made with a conventional device, which lacks the electrode made with the abovementioned specified metal capable of spontaneously supplementing redox product on the counter-electrode. The conventional device that was tested has the construction shown in FIG. 1 wherein the indication electrode 1, counter-electrode 2 and the auxiliary electrode 7 are all made with platinum as the chemically stable metal. The electrochromic solution is identical to those of the foregoing Examples 5 to 7. In such test device, at first a sufficient D.C. voltage is impressed across auxiliary electrode 7 and the counter-electrode 2 in order that a sufficient amount of the redox product 8 is deposited on the counter-electrode 2. Then, after 10,000 cycles of repetition of writing and erasing (without intermediate refreshing of the indication electrode 2), the indication becomes too weak to be practically used.

As is described in detail in the foregoing description, the device of the present invention comprises, on the counter-electrode, a film of the product of the redox reaction of the color indicating ions of electrochromic substance, at the state when the indication electrode and the counter electrode are of the same potential. Therefore, the redox reaction on the indication electrode and the counter-electrode become same but of opposite the direction, and hence, the electrochemical system can be operated with a very low voltage, with which hitherto observed electrode contamination by the counter ions is eliminated, thereby achieving a remarkably prolonged life time for the device.

What we claim is:

1. In an electrochromic display device having a container with at least one transparent part for observing the display and containing a first electrode, a second electrode and an electrochemical electrochromic substance contacting said first electrode and said second electrode, the improvement which comprises a coating of a product of a redox reaction of the color indicating ions of the electrochemical electrochromic substance formed on said second electrode under conditions when said first electrode does not have a coating of said product.

2. An electrochromic display device of claim 1, wherein the amount of the redox reaction product formed on said second electrode is at least equivalent to that to be formed on said first electrode during writing-in of a display.

3. An electrochromic display device of claim 1, wherein which further comprises an auxiliary electrode which contacts said electrochromic substance and a means to impress a D.C. voltage between said auxiliary electrode and either of said first electrode and said second electrode.

4. An electrochromic display device of claim 1, wherein said second electrode is made of a metal on which said redox reaction product of said color indicating ions is deposited by means of the difference of redox potentials between the metal and the electrochromic substance.

5. An electrochromic display device of claim 1, which further comprises an auxiliary electrode which contacts said electrochromic substance and is made of a metal on which said redox reaction product of said color indicating ions is deposited by means of the difference of redox potentials between the metal and the electrochromic substance.

6. An electrochromic display device of claim 5, wherein said auxiliary electrode is electrically connected to one of said first electrode and said second electrode made of a chemically stable material.

7. An electrochromic display device of claim 4, wherein said color indicating substance is selected from the group consisting of hexyl viologen cations, heptyl viologen cations, octyl viologen cations and benzyl violgen cations, and said metal of the auxiliary electrode is selected from the group consisting of zinc, lead, tin, indium, cadmium, iron and alloys thereof.

8. An electrochromic display device of claim 5, wherein said color indicating substance is selected from the group consisting of p-cyanophenyl viologen cation and silver compound cations, and said metal of the auxiliary electrode is selected from the group consisting of zinc, lead, tin, indium, cadmium, iron, aluminum, nickel, copper and alloys thereof.

9. An electrochromic display device of claim 4, wherein said color indicating substance is polytungstic acid cations and said metal of the auxiliary electrode is selected from the group consisting of zinc, lead, tin, indium, cadmium, iron, aluminum and alloys thereof.

10. An electrochromic display device of claim 4, wherein said color indicating substance is an anion selected from the group consisting of tetralkyl ammonium iodide, acetylcholine iodide, and propionylcholine iodide, and said auxiliary electrode is selected from the group consisting of silver oxide, manganese dioxide, nickel oxide, lead dioxide and a mixture thereof.

11. In an electrochemical electrochromic display device including a container having at least one transparent portion for display observation and having therein a first electrode, a second electrode and a solution of an electrochemical electrochromic substance containing color displaying ions in contact with both of said electrodes, a color display being caused by impressing a voltage across said electrodes in contact with the electrochemical substance in said container, the improvement comprising a coating of the reduction product of said color displaying ions or the oxidation product of said color displaying ions of the electrochemical electrochromic substance formed on said second electrode only under conditions when no voltage is impressed across said electrodes, said first electrode being substantially void of said coating.

12. The electrochemical electrochromic display device of claim 11 wherein said first electrode is the display electrode and said second electrode is the counter electrode.

13. The electrochemical electrochromic display device of claim 12 further including an auxiliary electrode in contact with said electrochromic solution and made of a metal upon which this redox reaction product of the color indicating ions is deposited as a result of the difference of redox potentials between the metal and the electrochromic substance.

14. In an electrochemical electrochromic display device including a container having at least one transparent portion for display observation and having therein a first electrode, a second electrode and a solution of an electrochemical electrochromic substance containing color displaying ions in contact with both of said electrodes, a color display being caused by impressing a voltage across said electrodes in contact with the electrochemical substance in said container, the improvement comprising a coating of the reduction product of said color displaying ions or the oxidation product of said color displaying ions of the electrochemical electrochromic substance formed on said second electrode only under conditions when no voltage is impressed across said electrodes, said second electrode made of a metal upon which said reduction or oxidation product is deposited by the difference in redox potentials as between said metal and said electrochemical electrochromic substance, said first electrode being substantially void of said coating.

* * * * *